Figure 1:
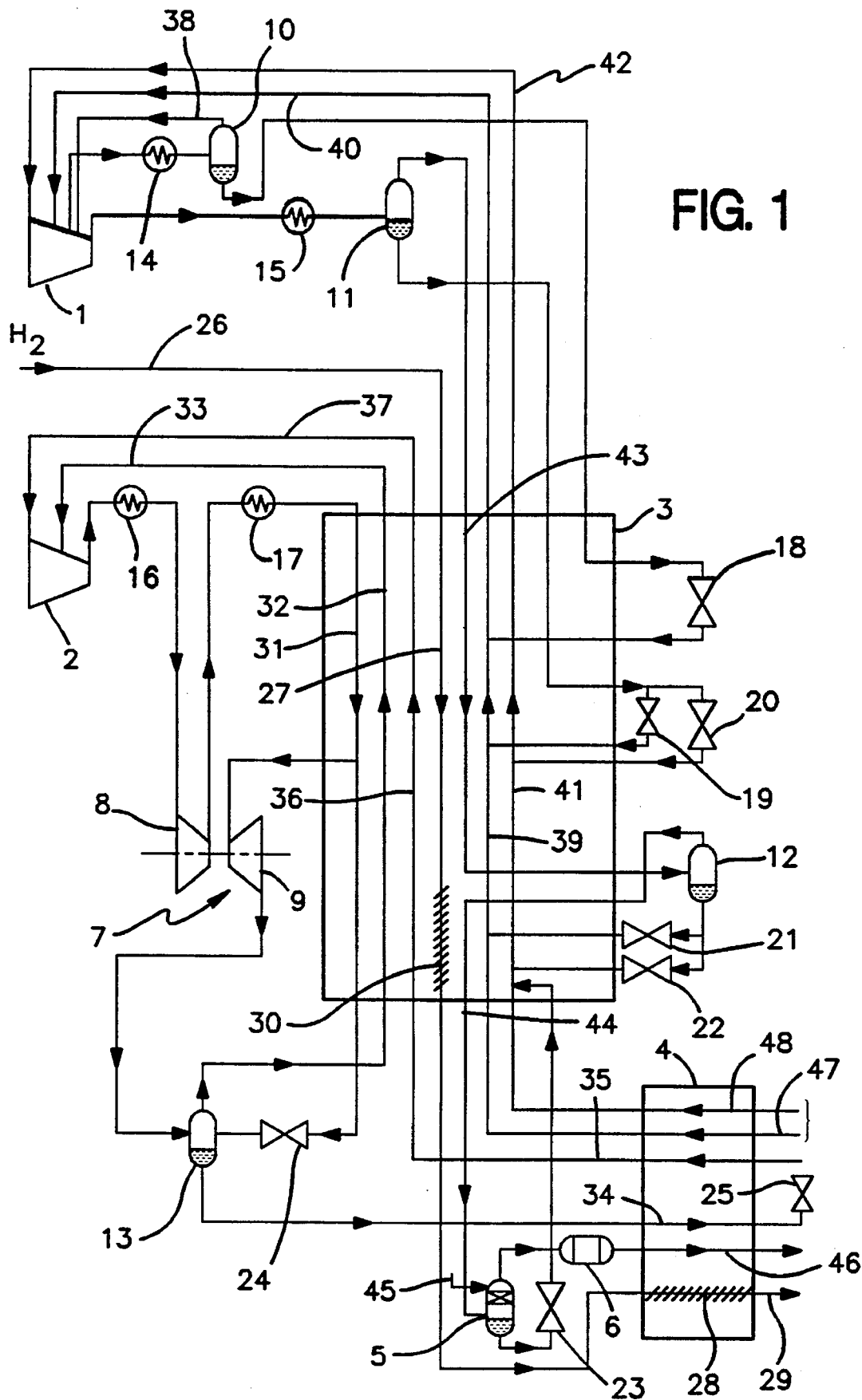

United States Patent [19]

Grenier

[11] Patent Number: 5,579,655

[45] Date of Patent: Dec. 3, 1996

[54] PROCESS AND APPARATUS FOR THE LIQUEFACTION OF HYDROGEN

[75] Inventor: Maurice Grenier, Paris, France

[73] Assignee: l'Air Liquide, Societe Anonyme Pour l'Etude et l'Exploitation des Procedes Georges Claude, Paris Cedex, France

[21] Appl. No.: 399,923

[22] Filed: Mar. 7, 1995

[51] Int. Cl.⁶ .................................................. F25J 1/00
[52] U.S. Cl. ................................ 62/607; 62/913
[58] Field of Search ............................. 62/9, 11, 13, 17, 62/18, 20, 607, 912, 913

[56] References Cited

U.S. PATENT DOCUMENTS

| | | | |
|---|---|---|---|
| 3,596,470 | 8/1971 | Jakob | 62/20 |
| 3,628,340 | 12/1971 | Meisler et al. | 62/18 |
| 4,242,875 | 1/1981 | Schaefer | 62/11 X |
| 4,266,957 | 5/1981 | Isalski | 62/18 |
| 4,380,461 | 4/1983 | Haslam et al. | 62/11 |
| 4,482,369 | 11/1984 | Carson et al. | 62/18 |
| 4,756,730 | 7/1988 | Stupin | 62/17 X |

*Primary Examiner*—Christopher Kilner
*Attorney, Agent, or Firm*—Young & Thompson

[57] ABSTRACT

A process and apparatus for the liquefaction of hydrogen, of the type using a refrigeration cycle whose cycle fluid comprises mostly hydrogen, and a closed liquid nitrogen refrigeration cycle. The cycle fluid is hydrogen and a mixture of $C_2+$ hydrocarbons. The hydrocarbons are liquefied and expanded to form fluids which vaporize in a substantially continuous manner between a temperature of the order of $-120°$ C. and a temperature adjacent ambient temperature. More particularly, the mixture of hydrocarbons is saturated $C_2$, $C_3$, and $C_5$ hydrocarbons, and if desired $C_4$, and separated liquefied fractions of these hydrocarbons are expanded at respective temperatures before expansion of the order of $0°$ C. to $-10°$ C., $-40°$ C. to $-50°$ C. and $-110°$ C. to $-120°$ C., to form refrigerant liquids adapted to be vaporized.

20 Claims, 1 Drawing Sheet

PROCESS AND APPARATUS FOR THE LIQUEFACTION OF HYDROGEN

The present invention relates to a process for the liquefaction of hydrogen, of the type using a refrigeration cycle whose cycle fluid comprises mostly hydrogen, and liquid nitrogen refrigeration means.

In the present text, the pressures indicated are absolute pressures.

It is well known that hydrogen is a gas too light to be compressed effectively by compressors of the centrifugal or axial type, which are economical to manufacture and to use. This is why hydrogen liquefiers now in use, whose refrigeration cycle is pure nitrogen, generally use reciprocating piston compressors for the compression of cycle hydrogen, with high investment and operating costs, the more so as the size of the installation increases. For example, for an installtion producing 300 tons per day of liquid hydrogen, it is necessary to use 23 alternative compressors in parallel.

The invention has for its object to provide a hydrogen liquefaction process permitting using a compressor of the centrifugal or axial type for the compression of the cycle fluid, while expending relatively low energy overall as well as a low cost of operation.

To this end, the invention has for its object a process of the recited type, characterized in that said cycle fluid is comprised by hydrogen and a mixture consisting essentially of $C_2$ hydrocarbons, and in that the hydrocarbons are liquefied and expanded to form fluids which vaporize in a fairly continuous fashion between a temperature of the order of $-120°$ C. and a temperature adjacent ambient temperature.

This process can comprise one or several of the following characteristics:

- the hydrocarbon mixture is constituted of saturated hydrocarbons which are $C_2$, $C_3$ and $C_5$, and if desired $C_4$, and liquefied fractions are expanded, particularly at temperatures respectively of the order of $0°$ C. to $-10°$ C., $-40°$ to $-50°$ C. and $-120°$ C., to form refrigerant liquids adapted to vaporize;
- in said cycle, a fraction of the cycle fluid is condensed adjacent ambient temperature, at the high pressure of the cycle and if desired at at least one intermediate pressure;
- at least one liquefied fraction is divided into two streams which are expanded to at least two different pressures to form the refrigerant fluids at each of these pressures;
- the mixture is washed with liquid propane at a temperature level slightly greater than the temperature of solidification of the $C_2$ and $C_3$ hydrocarbons, before effecting, at the same temperature level, a purification of the mixture by adsorption of all the material other than hydrogen;
- the liquid washing propane is formed by at least a portion of the propane from the refrigeration cycle, subcooled to the temperature of the washing column;
- liquid nitrogen refrigeration means comprise a second closed nitrogen refrigeration cycle;
- the liquid nitrogen refrigeration means comprise an external source of liquid nitrogen, particularly an air separation apparatus.

The invention also has for its object an apparatus for the liquefaction of hydrogen adapted to use the process defined above. This apparatus, of the type comprising a refrigeration cycle with a centrifugal or axial cycle compressor whose cycle fluid comprises mostly hydrogen, liquid nitrogen refrigeration means, and a heat exchange line which comprises passages for cooling the hydrogen to be treated and passages for reheating several refrigeration fluids, is characterized in that said cycle fluid is comprised of hydrogen and a mixture consisting essentially of $C_2$ hydrocarbons, and in that the installation comprises means to separate the condensed hydrocarbons, and means to expand these condensed hydrocarbons and to introduce them into said reheating passages.

Preferably, the refrigeration cycle compressor is of the centrifugal or axial type.

An example of operation according to the invention will now be described with respect to the accompanying drawing, in which the single FIG. 1 represents schematically a portion of a hydrogen liquefaction apparatus according to the invention.

There is shown in the drawing the diagram of a hydrogen liquefaction installation, except its coldest portion, which is conventional and in which the precooled cycle hydrogen is cooled, liquefied and expanded to produce the cold necessary for the liquefaction of the treated hydrogen or "process hydrogen".

There will thus be seen on the drawing a hydrogen cycle compressor 1, of the centrifugal or axial type, a nitrogen cycle compressor 2, also of the centrifugal or axial type, a heat exchange line shown in the form of two heat exchangers "warm" 3 and "cold" 4, both of the indirect heat exchange type and with countercurrent flow of the fluids in heat exchange relation, and preferably of the brazed aluminum plate type, a column 5 for washing with liquid propane, an apparatus 6 for purification by adsorption, a turbo-compressor group 7 comprising a fan 8 and an expansion turbine 9 whose rotors are keyed on the same shaft, phase separators 10 to 13, refrigerators 14 to 17 for air or water, associated respectively with the flows of compressed fluids from the compressors 1 and 2 and from the fan 8, and expansion valves 18 to 25.

Hydrogen to be liquefied arrives under 20 bars pressure via a conduit 26, is precooled in passages 27 of exchanger 3 to about $-178°$ C., and is further cooled to about $-192°$ C. in the passages 28 of the exchanger 4, from which it issues via conduit 29 to be sent to the cold portion of the installation. As shown, the coldest part of the passages 27, as well as the passages 28, are provided with a catalyzer for the ortho-para transformation of hydrogen, so that this transformation, which is very exothermic, will be effected before liquefaction of the hydrogen.

There will now be described the nitrogen refrigeration cycle.

High pressure nitrogen, leaving at 30 bars from the last stage of compressor 2, is brought in 16 to about ambient temperature, further compressed to 50 bars in 8, brought in 17 to the vicinity of ambient temperature, and introduced into the warm end of the exchanger 3, in passages 31 of this latter. At an intermediate temperature, of the order of $-120°$ C., a portion of this high pressure nitrogen leaves the exchanger and is expanded to 5 bars in the turbine 9. The rest of the high pressure nitrogen continues its cooling, is liquefied and subcooled until the cold end of exchanger 3, then is expanded to 5 bars in 24 and introduced into the separator 13.

The nitrogen from the turbine 9 is sent to the separator 13, whose vapor phase is reheated from the cold end to the warm end of exchanger 3 in passages 32, then returned via a conduit 33 to the intake of an intermediate stage of compressor 2.

The liquid phase collected in the separator 13 is subcooled in passages 34 of exchanger 4, expanded to about atmospheric pressure in 25, vaporized in passages 35 of the same exchanger, then reheated from the cold end to the warm end of exchanger 3 in passages 36 before being sent via a conduit 37 to the intake of the first stage of compressor 2.

There will now be described the hydrogen cycle.

The first stage of compressor 1 is supplied under about 1 bar with the following mixture:

$H_2=66.8\%$,
$C_2H_6=14.2\%$,
$C_3H_8=11.5\%$,
$C_5H_{12}=7.5\%$, to which is added at the intake of a first intermediate stage, under $\neq$bars, the following mixture:

$H_2=83.2\%$,
$C_2H_6=5.0\%$,
$C_3H_8=4.6\%$,
$C_5H_{12}=7.2\%$.

The mixture thus has the following mean composition:

$H_2=81.5\%$,
$C_2H_6=6\%$,
$C_3H_8=5.3\%$,
$C_5H_{12}=7.2\%$.

This mixture is withdrawn at 20 bars from the output of a second intermediate stage of the compressor 1, brought to the vicinity of ambient temperature in 14 and introduced into the separator 10. The vapor phase from this separator is sent via a conduit 38 to the intake of the following stage of the compressor, while the liquid phase, constituted essentially of the heaviest hydrocarbons, is subcooled to about $-5°$ C., expanded to about 6 bars in 18, vaporized under this pressure in the warm portion of passages 39 of exchanger 3, and returned via a conduit 40 to the intake of said first intermediate stage of compressor 1.

The high pressure mixture from the last stage of compressor 1 is brought to the vicinity of ambient temperature in 15 and introduced into the separator 11.

The liquid phase collected in this latter is subcooled to about $-45°$ C. and divided into two fractions. The first fraction, after expansion to about 6 bars in 19, is vaporized in the passages 39 and then reunited with the mixture from the expansion valve 18. The other fraction, after expansion to about 1 bar in 20, is vaporized and reheated in the passages 41 of exchanger 3, then returned to the intake of the first stage of the compressor 1 via a conduit 42.

The vapor phase from separator 11 is cooled to about $-120°$ C., while being partially liquified in passages 43 of exchanger 3, then introduced into the separator 12. The liquid phase collected in this latter is in its turn divided into two fractions which, after expansion respectively to about 6 bars and about 1 bar in 21 and 22, vaporizes in passages 39 and 41 respectively, then is reunited with the previously mentioned fractions introduced into the passages at higher temperature levels.

The vapor phase from separator 12, constituted of hydrogen containing about 1 part per million of propane and 0.3% ethane, is reintroduced into the exchanger 3, cooled to the cold end of this exchanger in passages 44 of the latter, then introduced into the base of column 5, which is supplied at its head, via a conduit 45, with subcooled liquid propane from the reserve of makeup propane of the hydrogen cycle. The column 5 operates at a temperature higher by several degrees, for example 3° to 5° C., than the solidification temperature of the ethane and of the propane.

The liquid at the base of column 5, constituted of ethane and propane and traces of hydrogen, is expanded to about 1 bar in 23, then introduced into the passages 41, near the cold end of these passages. This liquid represents a small fraction, for example of the order of less than 1%, of the flow of the cycle mixture.

The vapor at the head of column 5, constituted by hydrogen containing typically less than 5 ppm (parts per million) of hydrocarbons, is subjected to final purification by adsorption in 6, then is cooled in passages 46 of exchanger 4 and sent to the cold portion of the installation. There is indicated on the drawing passages 47 and 48, respectively under about 6 bars and about 1 bar, for reheating the cycle hydrogen returning from this cold portion, these passages being connected to the cold end of the passages 39 and 41 of the exchanger 3.

There is thus obtained a quasi-continuous vaporization of liquids over all the temperature range comprised between $-120°$ C. and ambient temperature, which relieves to the same extent the nitrogen cycle over this range of temperatures, and permits omitting any auxiliary refrigeration cycle, for example at $+5°$ C. and at $-40°$ C. The refrigeration load of the nitrogen cycle may thus be reduced practically by half relative to an installation comprising, in addition to this cycle, a pure nitrogen cycle.

It is to be noted that the absence of methane and of nitrogen in the cycle mixture permits eliminating almost all the components other than hydrogen by simple condensation, and to obtain at the cold end of the exchanger 3 a sufficiently purified mixture that the absorber 6 need be regenerated only at long intervals of time, for example once per week, at ambient temperature. This advantage is reinforced by the presence of the liquid propane washing column 5, as explained above.

It is to be noted however that the cycle mixture could if desired contain on the one hand very small quantities of methane and/or nitrogen, in any case in proportions less than 1%, and on the other hand $C_{6+}$ hydrocarbons.

As a modification, the refrigeration liquid nitrogen can be supplied from an external source, particularly by an apparatus for separating air by distillation located in the vicinity.

If the hydrogen liquefier is supplied with liquid nitrogen from an air distillation apparatus, such as oxytonne, it is of interest to return said nitrogen to the distillation apparatus after vaporization and partial reheating to $-125°$ C.

Thus, under these conditions, the cold required for the reheating of this nitrogen from $-125°$ C. to ambient temperature will be supplied by the hydrogen liquefier and not by the distillation apparatus. As a result, there is an increase in hydrocarbon content of the cycle hydrogen, which is favorable both to the technology of the cycle hydrogen compression machine (fewer stages) and to the specific energy.

The system can be further improved in this case by supplying the necessary cold to the hydrogen liquefaction apparatus in part by liquid nitrogen vaporized and reheated at $-125°$ C. and in part by gaseous nitrogen to be reheated between $-190°$ C. and $-125°$ C.

One could even, in an extreme case, supply all the necessary cold to the distillation apparatus between the ambient temperature and $-125°$ C. from the hydrogen liquefier (by cooling the rectification support nitrogen for example between ambient temperature and $-120°$ C. in the hydrogen liquefier).

I claim:

1. In a process for the liquefaction of hydrogen, using a refrigeration cycle whose cycle fluid comprises mostly hydrogen, and liquid nitrogen refrigeration means; the improvement wherein said cycle fluid is comprised by hydrogen and a mixture consisting essentially of $C_{2+}$ hydrocarbons, liquefying and expanding said hydrocarbons to form fluids which vaporize in a substantially continuous manner between a temperature of the order of $-120°$ C. and a temperature adjacent ambient temperature, and condensing a stream of hydrogen separate from said cycle fluid by indirect heat exchange with said cycle fluid and said liquid nitrogen.

2. A process according to claim 1, wherein the mixture of hydrocarbons comprises saturated $C_2$, $C_3$, and $C_5$ hydrocarbons, and expanding liquefied fractions of said $C_2$, $C_3$, and $C_5$ hydrocarbons at respective temperatures before expansion of about $0°$ C. to $-10°$ C., $-40°$ C. to $-50°$ C. and $-110°$ C. to $-120°$ C., to form refrigerant liquids adapted to be vaporized.

3. A process according to claim 1, and condensing, in said cycle, a fraction of the cycle fluid adjacent ambient temperature, at a high cycle pressure.

4. A process according to claim 3, wherein at least one liquefied fraction of said cycle fluid is divided into two streams which are expanded to at least two different pressures to form refrigeration fluids at each of said two different pressures.

5. A process according to claim 1, and washing the mixture with liquid propane at a temperature level slightly higher than the solidification temperature of the $C_2$ and $C_3$ hydrocarbons, before effecting at the same temperature level a purification of the mixture by adsorption of all the components other than hydrogen.

6. A process according to claim 5, wherein the washing liquid propane is formed of at least one portion of makeup propane of the refrigeration cycle, subcooled to the temperature of a washing column.

7. A process according to claim 1, wherein the liquid nitrogen refrigeration means comprise a closed nitrogen refrigeration cycle.

8. A process according to claim 1, wherein the liquid nitrogen refrigeration means comprise an external source of liquid nitrogen.

9. A process according to claim 8, wherein gaseous nitrogen from the refrigeration means is returned to the external source of liquid nitrogen.

10. In apparatus for the liquefaction of hydrogen, comprising a refrigeration cycle whose cycle fluid comprises mostly hydrogen, liquid nitrogen refrigeration means, and a heat exchange line which has cooling passages for hydrogen to be treated and reheating passages for several refrigeration fluids; the improvement wherein said cycle fluid is comprised by hydrogen and a mixture consisting essentially of $C_{2+}$ hydrocarbons, means to separate condensed hydrocarbons, means to expand the thus-separated condensed hydrocarbons and to introduce them separately into said reheating passages, and means to condense a stream of hydrogen separate from said cycle fluid by indirect heat exchange with said cycle fluid and said liquid nitrogen.

11. Apparatus according to claim 10, wherein the hydrocarbons mixture comprises saturated $C_2$, $C_3$, and $C_5$ hydrocarbons.

12. Apparatus according to claim 10, further comprising means to condense a fraction of the fluid of the cycle, adjacent ambient temperature, at a high pressure of the cycle.

13. Apparatus according to claim 10, wherein the reheating passages are at least two different pressures.

14. Apparatus according to claim 10, which further comprises a liquid propane washing column for the mixture at a temperature level slightly higher than the solidification temperature of the $C_2$ and $C_3$ hydrocarbons, followed by an apparatus for purification of the mixture by adsorption at the same temperature level.

15. Apparatus according to claim 10, further comprising a refrigeration cycle compressor of the centrifugal or axial type.

16. Apparatus according to claim 10, wherein the liquid nitrogen refrigeration means comprise a closed nitrogen refrigeration cycle.

17. Apparatus according to claim 10, wherein the liquid nitrogen refrigeration means comprise an external source of liquid nitrogen.

18. Apparatus according to claim 17, which further comprises means to return gaseous nitrogen from the refrigeration means to the external source of liquid nitrogen.

19. A process according to claim 1, wherein the sum of methane and nitrogen in said cycle fluid is less than 1% by volume.

20. Apparatus according to claim 10, wherein the sum of methane and nitrogen in said cycle fluid is less than 1%.

\* \* \* \* \*